(12) United States Patent
Hsieh

(10) Patent No.: US 7,223,193 B2
(45) Date of Patent: May 29, 2007

(54) DIFFERENTIAL MECHANISM

(75) Inventor: Shih-Hua Hsieh, Jhuci Township, Chiayi County (TW)

(73) Assignee: Shine Far Metal Industry Co., Ltd., Guanyin Township (TW)

( * ) Notice: Subject to any disclaimer, the term of this patent is extended or adjusted under 35 U.S.C. 154(b) by 182 days.

(21) Appl. No.: 11/050,387

(22) Filed: Feb. 3, 2005

(65) Prior Publication Data

US 2006/0172848 A1 Aug. 3, 2006

(51) Int. Cl.
*F16H 48/06* (2006.01)
(52) U.S. Cl. ...................................... 475/230; 475/248
(58) Field of Classification Search ................ 475/230, 475/248, 204
See application file for complete search history.

(56) References Cited

U.S. PATENT DOCUMENTS

| | | | | |
|---|---|---|---|---|
| 1,337,369 | A | * | 4/1920 | Polaski ........................ 475/159 |
| 4,513,635 | A | * | 4/1985 | Takimura et al. ........... 475/230 |
| 6,117,038 | A | * | 9/2000 | Nishiji et al. ............... 475/221 |
| 6,368,242 | B1 | * | 4/2002 | Irwin .......................... 475/230 |
| 6,470,988 | B1 | * | 10/2002 | Beesley ....................... 180/245 |
| 6,848,337 | B2 | * | 2/2005 | Ma et al. ........................ 74/640 |
| 7,025,702 | B2 | * | 4/2006 | Saito et al. .................. 475/160 |
| 7,115,057 | B2 | * | 10/2006 | House ............................. 475/5 |
| 2002/0132693 | A1 | * | 9/2002 | Forrest et al. .............. 475/150 |
| 2004/0192488 | A1 | * | 9/2004 | Prucher ....................... 475/230 |

FOREIGN PATENT DOCUMENTS

FR 2553721 A * 4/1985
GB 2029783 A * 3/1980

* cited by examiner

*Primary Examiner*—Ha Ho
*Assistant Examiner*—J K Holmes
(74) *Attorney, Agent, or Firm*—C. G. Mersereau; Nikolai & Mersereau, P.A.

(57) ABSTRACT

A differential mechanism includes a casing having two opposite ends each having a cover longitudinally mounted thereon. A rotator assembly is mounted in the casing and has a seat received in the casing. A shaft is diametrically mounted in the seat. Two differential gears are respectively rotatably mounted to two opposite ends of the shaft and are respectively engaged to a corresponding one of two drive gears that are respectively securely sleeved on a first drive axle and a second drive axle. An input coupling and an output coupling are respectively longitudinally mounted to the two opposite ends of the seat for centrally mounting the first drive axle and the second drive axle to two opposite ends of the seat. The input coupling is engaged to a transfer element.

10 Claims, 9 Drawing Sheets

DIFFERENTIAL MECHANISM

BACKGROUND OF THE INVENTION

1. Field of the Invention

The present invention relates to differential mechanism and, more particularly, to a differential mechanism that has a variable deceleration ratio.

2. Description of Related Art

A conventional differential mechanism in accordance with the prior art shown in FIG. 9 comprises two differential gears (9, 9') each having an axle (92, 92') centrally extending therefrom and slidably entering a groove (81) that is defined in an inner periphery of a drive gear (8), as shown by the arrow B. However, the above design will badly influence the stability of the transmission of the differential mechanism. The conventional differential mechanism may be idle when the axles (20, 20') do not linearly correspond to each other or the gap between the differential gears (9, 9') and the drive gears (10, 10') becomes great. A sliding effect occurs between the differential gears (9, 9') and the drive gears (10, 10') when a gap is formed therebetween. As a result, the differential gears (9, 9') and the drive gears (10, 10') crash against each other forming noise.

Furthermore, the drive gear (8) and the input gear (19) of the conventional differential mechanism are contained in a casing such that a speed ratio between the drive gear (8) and the input gear (19) can not be adjusted to suit various necessities.

The present invention has arisen to mitigate and/or obviate the disadvantages of the conventional differential mechanism.

SUMMARY OF THE INVENTION

The main objective of the present invention is to provide an improved differential mechanism that can be used for various transfer elements.

To achieve the objective, the differential mechanism in accordance with the present invention comprises a casing having two opposite ends each having a cover longitudinally mounted thereon. A rotator assembly is mounted in the casing and has a seat received in the casing. A shaft is diametrically mounted in the seat, and two differential gears are respectively rotatably mounted to two opposite ends of the shaft and respectively engaged to a corresponding one of two drive gears that are respectively securely sleeved on a first drive axle and a second drive axle. An input coupling and an output coupling are respectively longitudinally mounted to the two opposite ends of the seat for centrally mounting the first drive axle and the second drive axle to two opposite ends of the seat. The input coupling is engaged to a transfer element.

Further benefits and advantages of the present invention will become apparent after a careful reading of the detailed description with appropriate reference to the accompanying drawings.

DETAILED DESCRIPTION OF THE INVENTION

Figure 1:
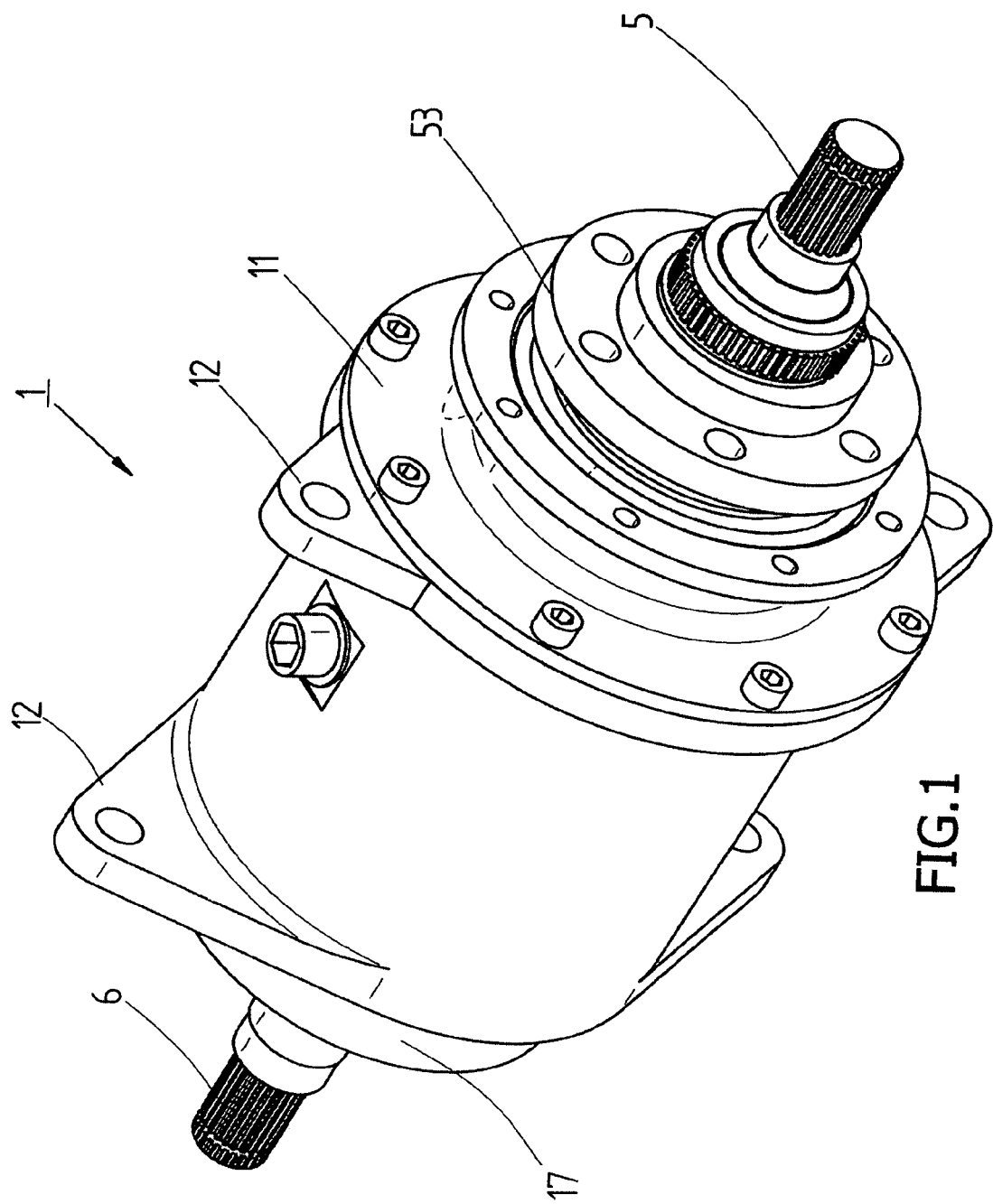
FIG. 1 is a perspective view of a differential mechanism in accordance with the present invention.
Figure 2:
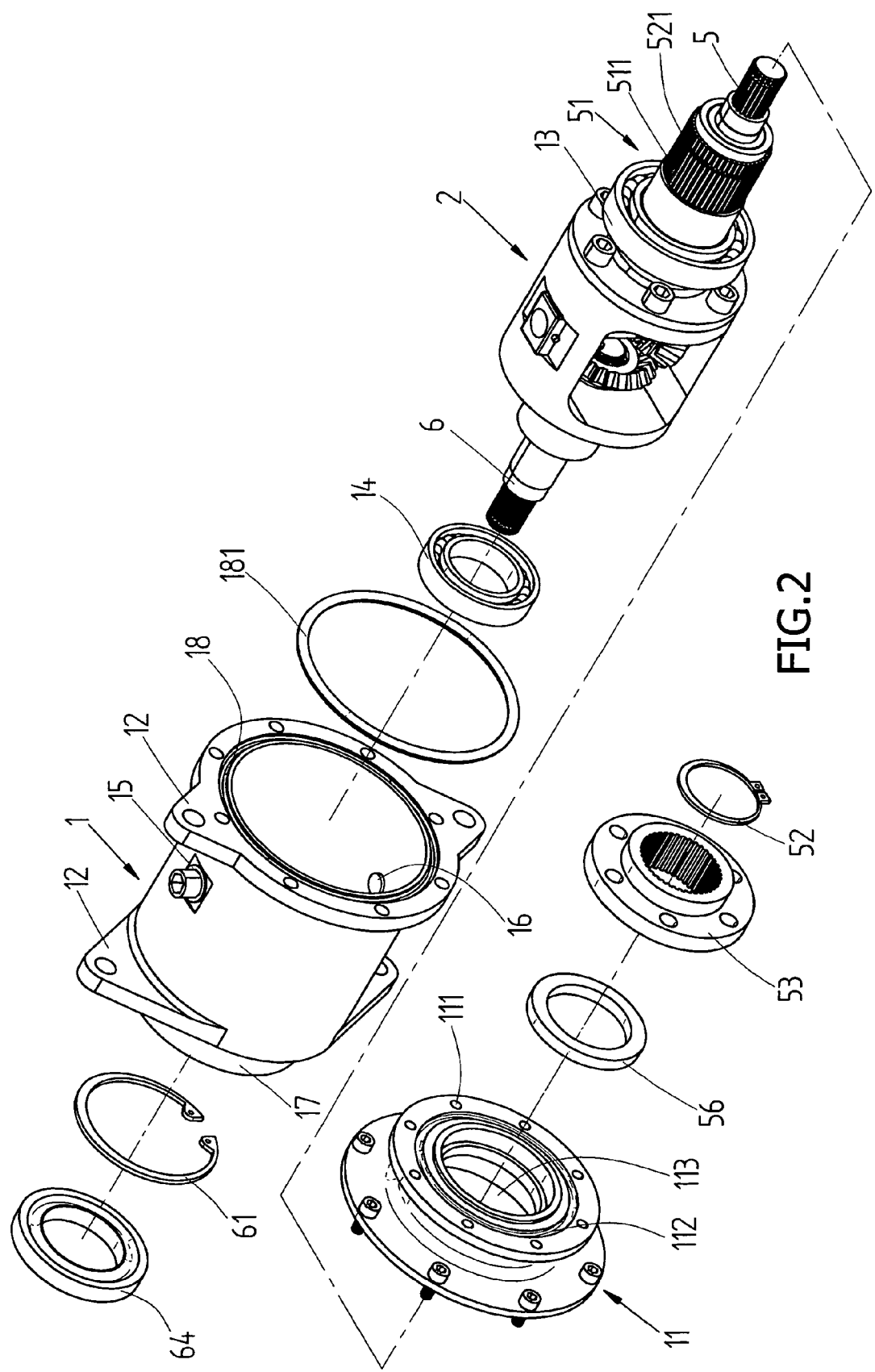
FIG. 2 is an exploded perspective view of the differential mechanism in FIG. 1.
Figure 3:
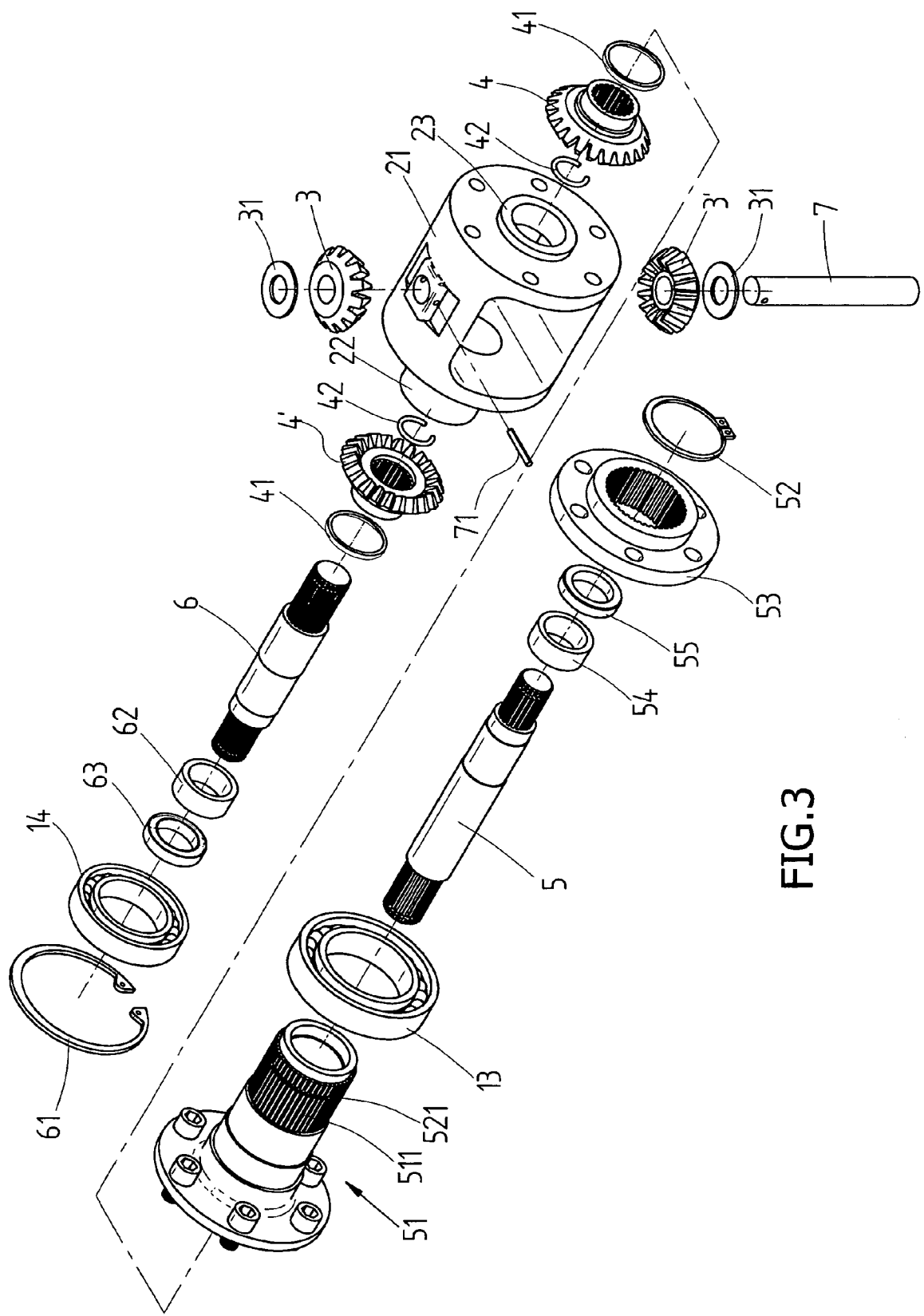
FIG. 3 is an exploded perspective view of a rotor assembly of the differential mechanism in accordance with the present invention.
Figure 4:
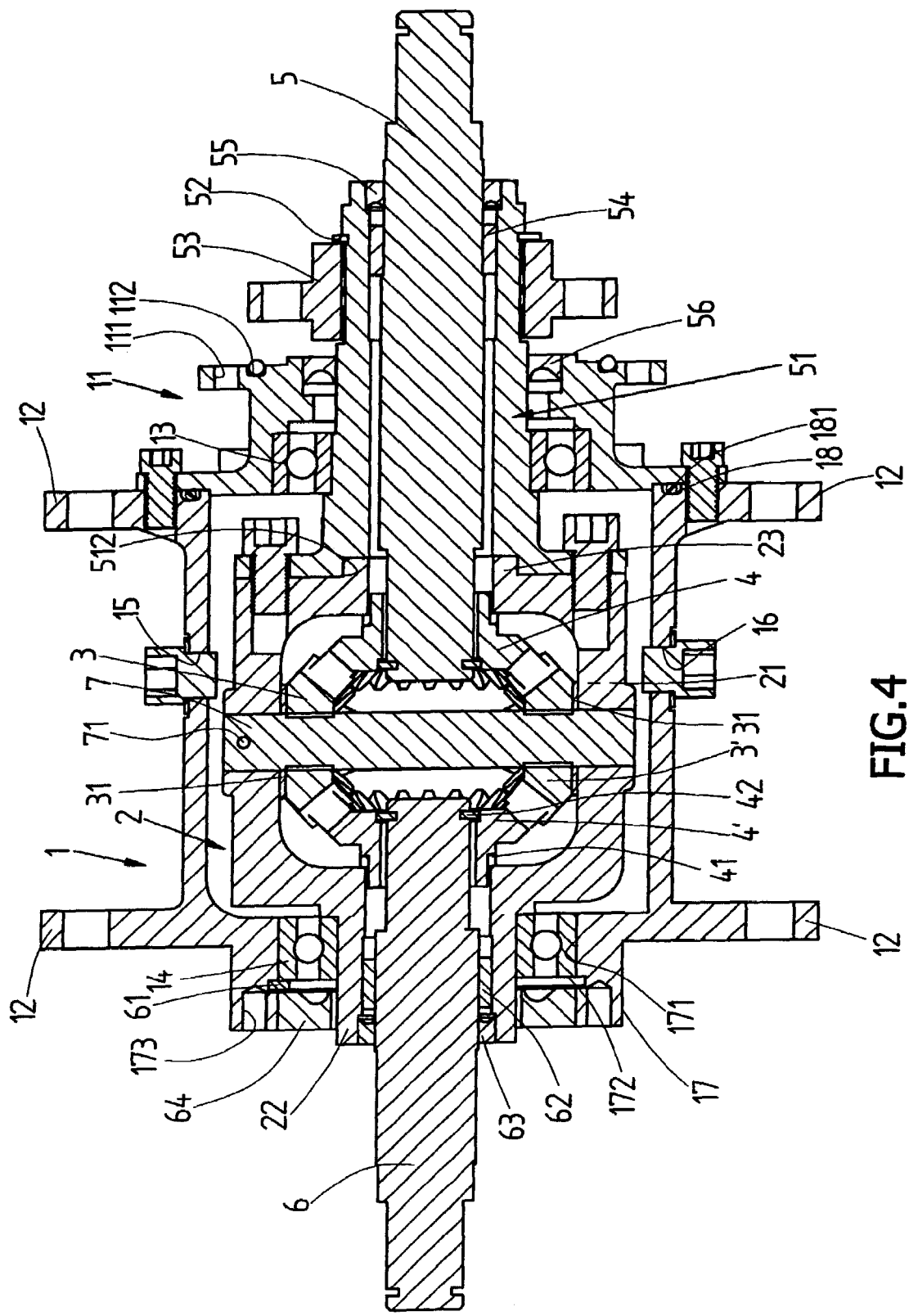
FIG. 4 is a cross-sectional view of the differential mechanism in FIG. 1.

Referring to the drawings and initially to FIGS. 1–3, a differential mechanism in accordance with the present invention includes a casing (1) having multiple ears (12) integrally formed on a top portion of the casing (1) for easily mounting the differential mechanism of the present invention and strengthening the structure of the casing (1). The casing (1) has a skirt (17) longitudinally centrally extending from a first end thereof. The skirt (17) has multiple threaded holes (173) longitudinally defined therein. A bearing (14) is mounted in an inner periphery (171) of the skirt (17). The skirt (17) has an annular groove (172) defined in the inner periphery (171) of the skirt (17), and a C-shaped ring (61) holds the bearing (14) in place. The casing (1) has an inlet (15) and an outlet (16) respectively defined in an outer periphery of the casing (1) for pouring and draining lubricant. The casing (1) has an annular groove (18) defined in a second end thereof for receiving an O-ring (181).

A cover (11) is mounted to the second end of the casing (1) and securely abuts the O-ring (181) to provide an airtight effect between the casing (1) and the cover (21). The cover (11) has an annular groove (112) and multiple threaded holes (111) defined in one side thereof opposite to the casing (1). The threaded holes (111) in the cover (11) are provided for the cover (11) to be mounted to a gearbox by bolts. A through hole (113) is centrally defined in the cover (11).

A rotor assembly (2) is disposed in the casing (1). The rotor (2) includes a cylindrical seat (21) having a first protrusion (22) and a second protrusion (23) respectively longitudinally extending from two opposite ends of the cylindrical seat (21). In the preferred embodiment of the present invention, the cylindrical seat (21) is made of cast steel.

A shaft (7) diametrically extends into and is mounted in the cylindrical seat (21). A pin (71) diametrically extends through one end of the shaft (7) to hold the shaft (7) in place in the cylindrical seat (21). Two differential gears (3, 3') are respectively rotatably sleeved on two opposite ends of the shaft (7) in the cylindrical seat (21) and are respectively engaged to a corresponding one of two drive gears (4, 4'). The drive gears (4, 4') are respectively securely sleeved on a first drive axle (5) and a second drive axle (6) and are positioned by locking members (42). The second drive axle (6) extends to and within the first protrusion (22) of the cylindrical seat (21). Two first stoppers (31) are respectively mounted between the two differential gears (3, 3') and the cylindrical seat (21), and two second stoppers (41) are respectively mounted between the two drive gears (4, 4') and the cylindrical seat (21). The first stoppers (31) and the second stoppers (41) are made of copper or steel.

An input coupling (51) is sleeved on the first drive axle (5) and extends through the through hole (113) in the cover (11).

A cavity (512) is defined in the input coupling (51) for receiving the second protrusion (23) of the cylindrical seat (21). The input coupling (51) includes an engaging portion (511) formed thereon and a groove (521) defined therein. The engaging portion (511) is adapted to be connected to a transfer element (53), and a locking member (52) is mounted to the groove (521) to prevent the engaging portion (511) from detaching from the transfer element (53). A first adjust element (54, 62) and a second adjust element (55, 63) are respectively sleeved on the first drive axle (5) and the second drive axle (6) for linearly adjusting a distance between the drive gears (4, 4') and the differential gears (3, 3'). The first adjust element (54, 62) and the second adjust element (55, 63) are respectively received in the input coupling (51) and the first protrusion (22) of the cylindrical seat (21). The first adjust element (54, 62) and the second adjust element (55, 63) are a copper sleeve or a needle bearing for being easily mounted and adjusting.

A first bearing (13) is sleeved on the input coupling (51) and securely received in the through hole (113) in the cover (11). The second bearing (14) is sleeved on the first protrusion (22) of the cylindrical seat (21) and securely received in the skirt (17) of the casing (1). As a result, the casing (1), the rotor assembly (2) and the cover (11) are sequentially assembled. In addition, a first oil seal (56) and a second oil seal (64) are respectively mounted to the first bearing (13) and the second bearing (14).

Figure 5:
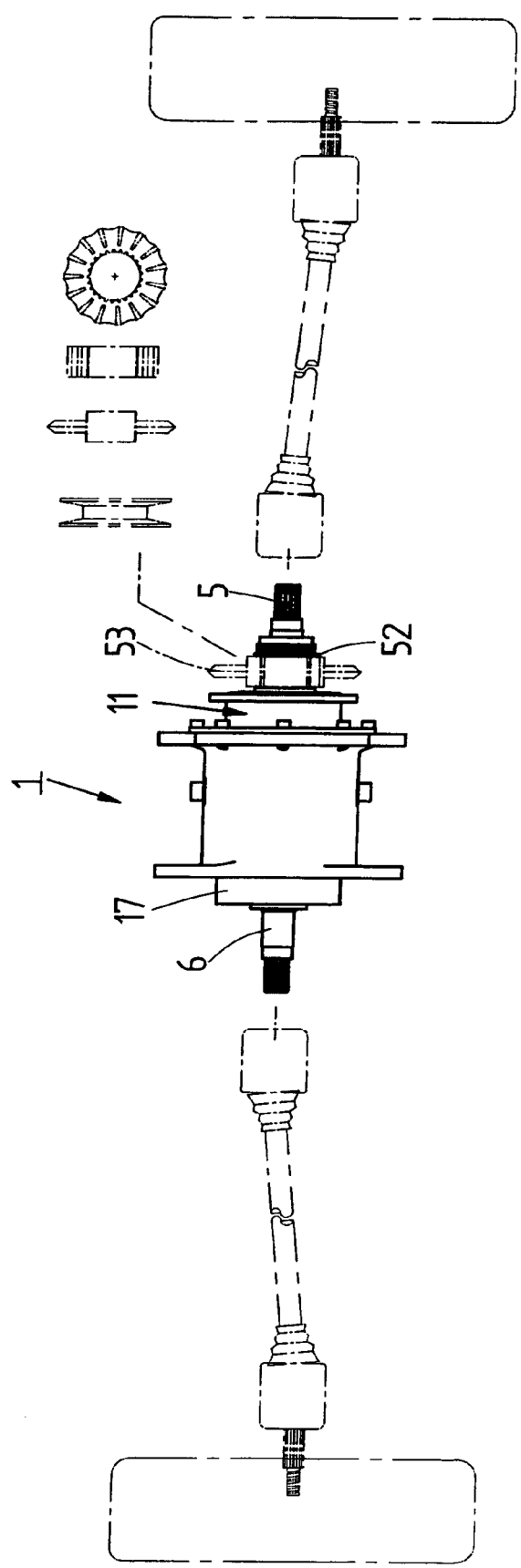
FIG. 5 is a first schematic view of the differential mechanism of the present invention.
Figure 6:
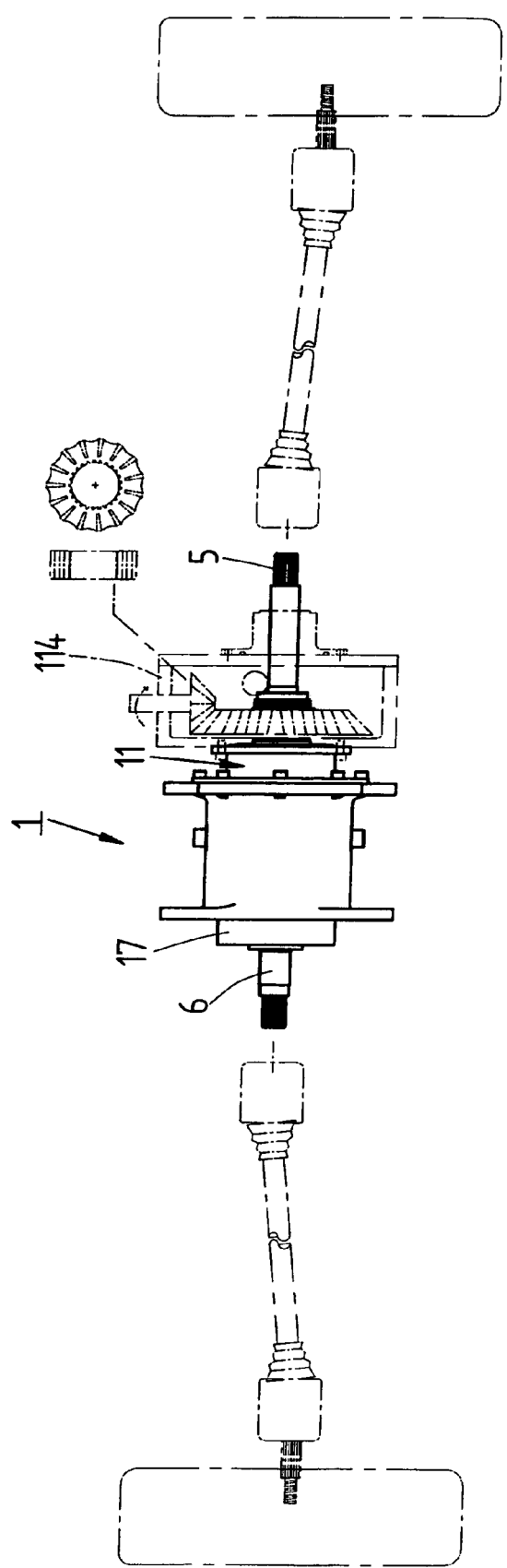
FIG. 6 is a second schematic view of the differential mechanism of the present invention.

The transmission type of the differential mechanism in accordance with the present invention can be an independent suspension or an integral suspension. When the transmission type is an independent suspension, the transfer element (53) is directly sleeved on the engaging portion (511) of the input coupling (51) and positioned by the locking member (52). As shown in FIG. 5, the transfer element (53) can be selected from one of a chain wheel, a spur bear, a bevel gear and a belt wheel. As shown in FIG. 6, the cover (11) can be mounted to various gearboxes (114) by the threaded holes (111) and bolts.

Figure 7:
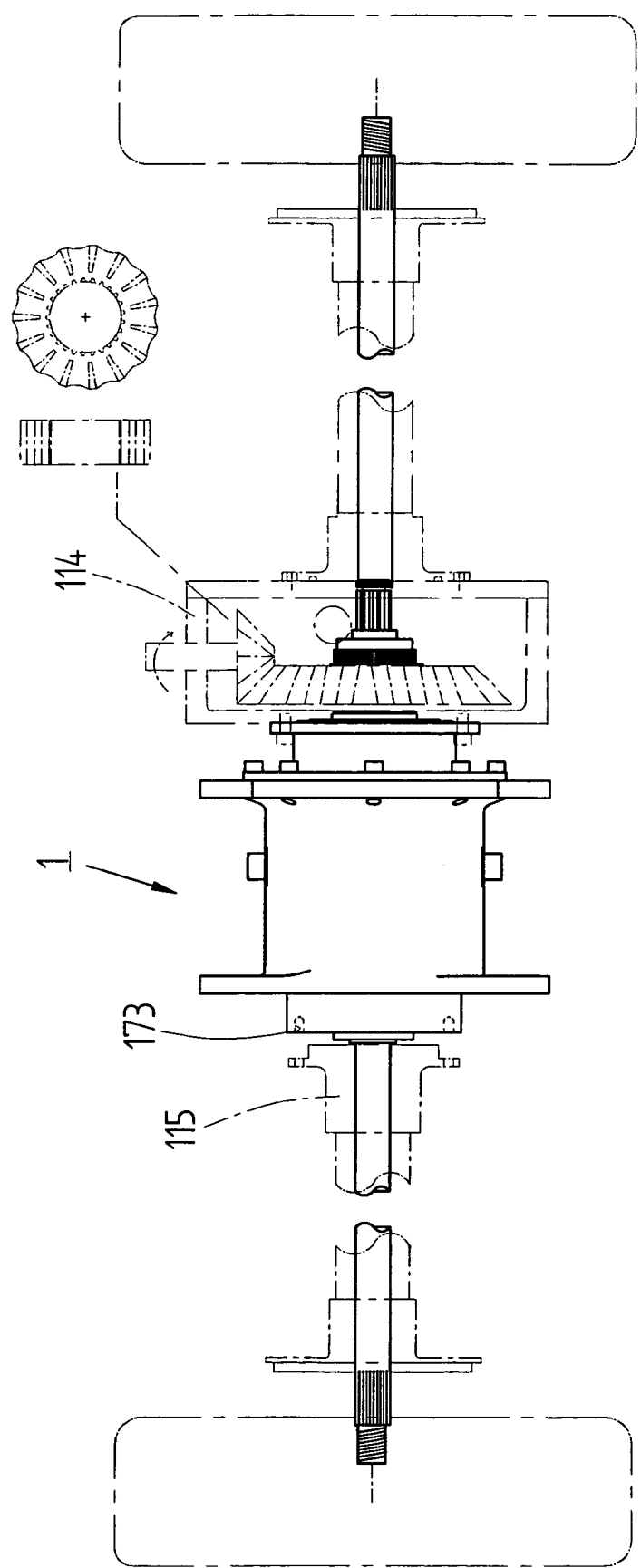
FIG. 7 is a third schematic view of the differential mechanism of the present invention.
Figure 8:
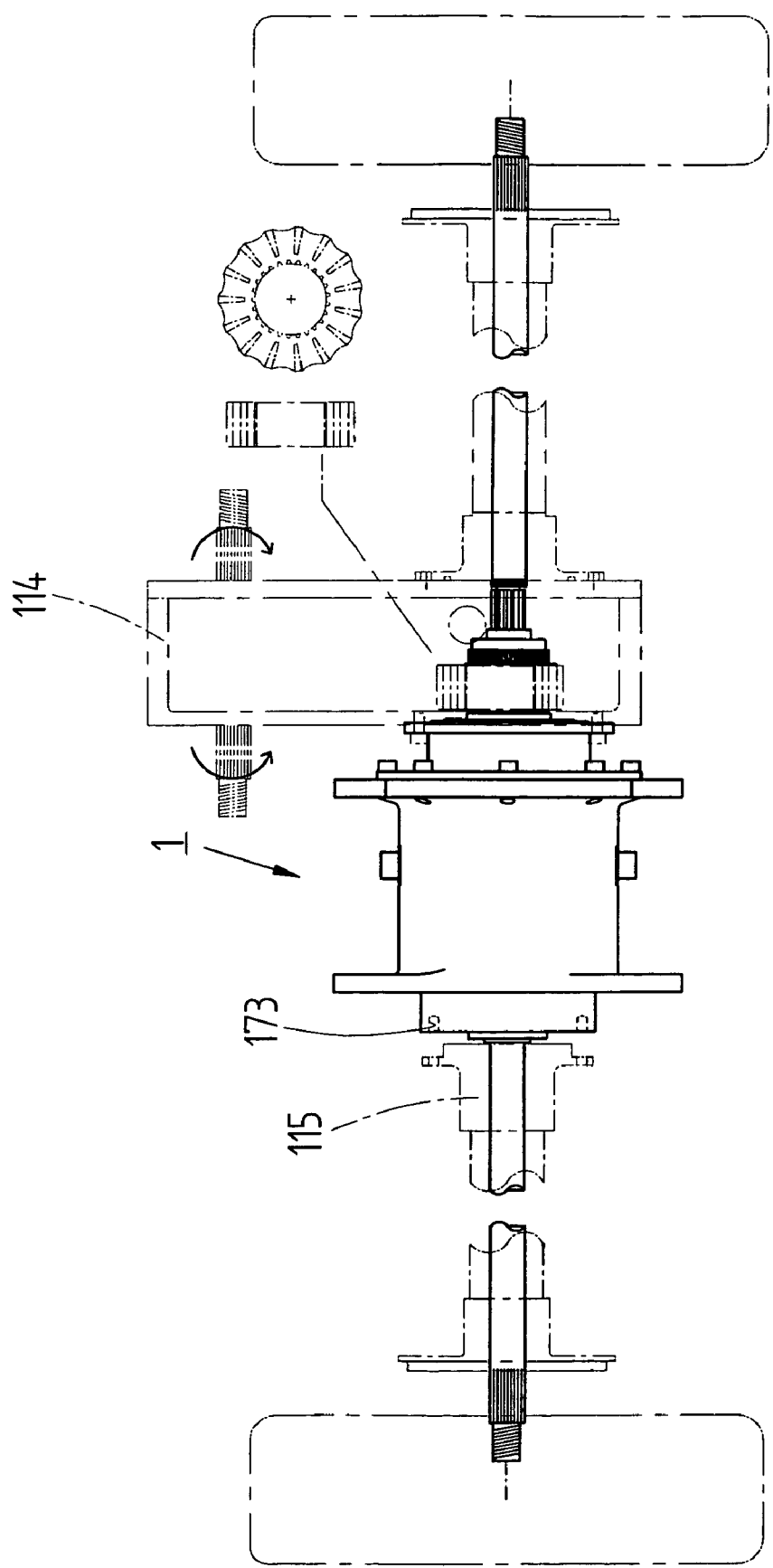
FIG. 8 is a fourth schematic view of the differential mechanism of the present invention.
Figure 9:
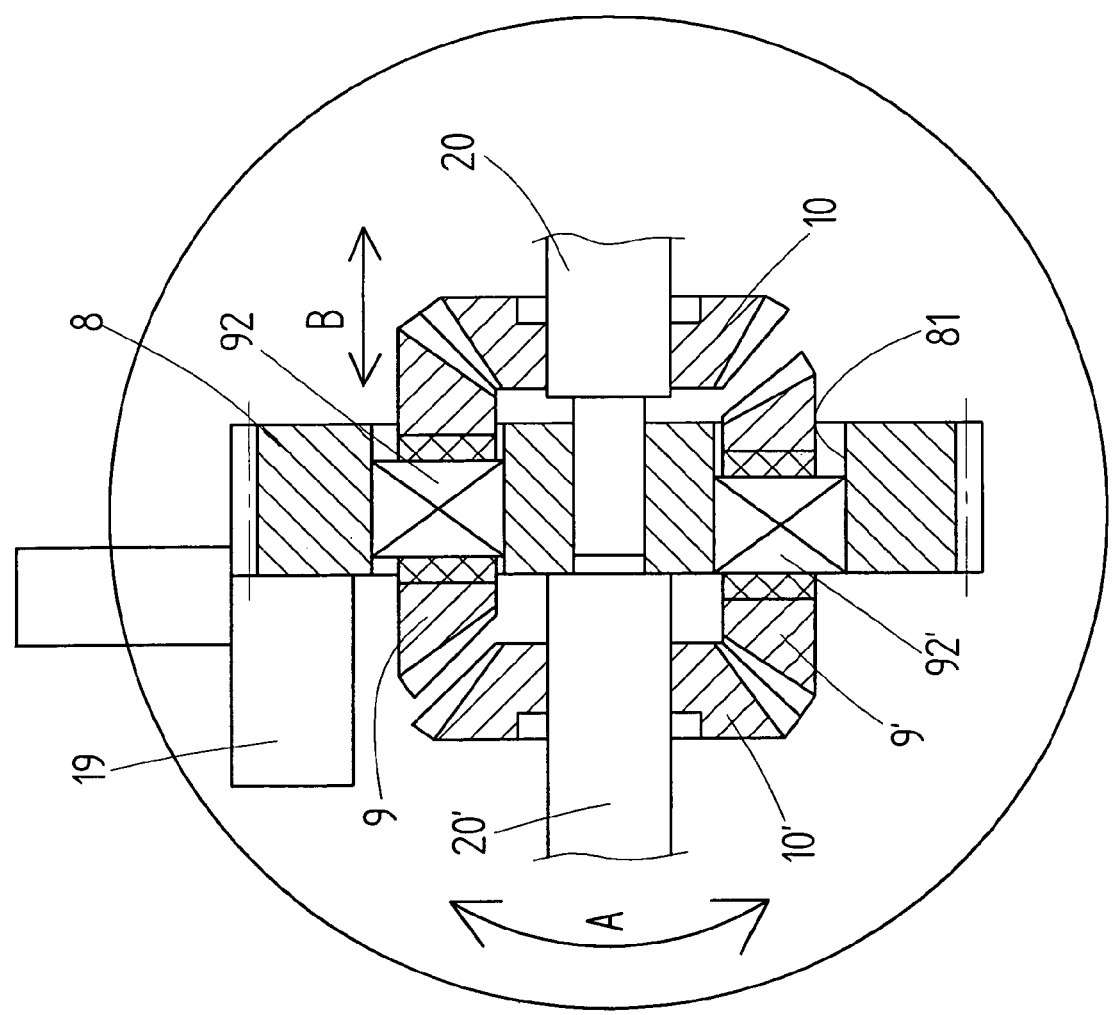
FIG. 9 is a partially cross-sectional view of a conventional differential mechanism in accordance with the prior art.

With reference to FIGS. 7 and 8, when the transmission type is an integral suspension, the second drive axle (6) is lengthened and the second oil seal (64) is removed. A collar (115) is sleeved on the second drive axle (6) and mounted to the skirt (17) due to the threaded holes (173) in the skirt (17) and multiple bolts. The cover (11) can be mounted to various gearboxes (114) by the threaded holes (111) and bolts.

The rotor assembly (2) is rotated when the input coupling (51) is rotated by the transfer element (53). The first drive axle (5) and the second drive axle (6) are synchronously rotated to drive a wheel mounted thereon for propelling a car, for example, because the differential gears (3, 3') are respectively engaged to the drive gears (4, 4'). When the car turns right/left, the rotating ratio of the left/right wheel is higher than that of the right/left wheel such that the drive gear (4)/(4') automatically forms a differential condition due to the differential gear (3)/(3').

As described above, the differential mechanism in accordance with the present invention comprises multiple advantages as follows.

1. The engaging portion (511) is formed by the input coupling (5.1) extending out of the casing (1) such that the input coupling (51) can be easily connected to various transfer elements (53).

2. The rotor assembly (2) and the cylindrical seat (21) are made of cast steel that has a lubricative effect. Consequently, the differential gears (3, 3') and the drive gears (4, 4') can be easily mounted into the rotor assembly (2) and connected to the cylindrical seat (21) without bearings. As a result, the manufacturing cost is reduced.

3. The input coupling (51) includes an engaging portion (511) formed thereon and a groove (521) defined therein. The engaging portion (511) is adapted to be connected to a transfer element (53), and a locking member (52) is mounted to the groove (521) to prevent the engaging portion (511) from detaching from the transfer element (53). As a result, the safety of the present invention is promoted.

4. The cover (11) has an annular groove (112) and multiple threaded holes (111) defined in one side thereof opposite to the casing (1). The threaded holes (111) in the cover (11) are provided for the cover (11) being mounted to various gearboxes (114) by bolts.

5. The casing (1) of the present invention is integrally formed such that the manufacturing cost of the casing (1) is lowed. In addition, the casing (1) has multiple ears (12) integrally formed on a top portion thereof for easily mounting the differential mechanism of the present invention and strengthening the structure of the casing (1).

Although the invention has been explained in relation to its preferred embodiment, it is to be understood that many other possible modifications and variations can be made without departing from the spirit and scope of the invention as hereinafter claimed.

What is claimed is:

1. A differential mechanism comprising:
   a casing with first and second ends, with the first end having a cover longitudinally mounted thereon, with the cover including a through hole, with the second end having an inner periphery; and
   a rotator assembly mounted in the casing, with the rotor assembly including:
      a cylindrical seat rotatably received in the casing, with the cylindrical seat including a protrusion rotatably received in the inner periphery of the second end of the casing;
      a shaft diametrically mounted in the cylindrical seat and having two opposite ends;
      two differential gears respectively rotatably mounted to the two opposite ends of the shaft and respectively engaged to a corresponding one of two drive gears that are respectively securely sleeved on a first drive axle and a second drive axle, with the first and second drive axles being rotatable relative to the casing and the cylindrical seat, with the first drive shaft rotatably extending through the cover, with the second drive shaft rotatably extending through the second end of the casing, with the protrusion being rotatably mounted on the second drive shaft; and
      an input coupling rotatably mounted in the casing and mounted to the seat and extending through the cover, with the input coupling being sleeved on the first drive axle and rotatable relative thereto, with the input coupling rotatable relative to the cover of the casing, thereby the input coupling can be easily connected to a transfer element with the first and second ends of the casing including radially extending ears for mounting the casing, wherein the cover has a radially extending flange axially spaced from the ears of the first and second ends of the casing, with the radially extending flange including multiple threaded holes defined therein for easily mounting the differential mechanism to a gearbox.

2. The differential mechanism as claimed in claim 1, wherein the input coupling forms an engaging portion and has a groove defined therein, the engaging portion adapted to be connected to said transfer element and a locking member mounted to the groove to prevent the engaging portion from detaching from the transfer element.

3. The differential mechanism as claimed in claim 1, wherein the shaft is positioned relative to the seat by a pin.

4. The differential mechanism as claimed in claim 1, the casing is integrally formed and has multiple ears integrally formed on a top portion of the casing for easily mounting the differential mechanism and strengthening the structure of the casing.

5. The differential mechanism as claimed in claim 1, wherein the transfer element is a gearbox.

6. The differential mechanism as claimed in claim 1, wherein the transfer element is selected from one of a chain wheel, a spur gear, a bevel gear and a belt wheel axially spaced from the radially extending flange of the cover.

7. The differential mechanism as claimed in claim 1, wherein two first stoppers are respectively mounted between the two differential gears and the cylindrical seat, and two second stoppers are respectively mounted between the two drive gears and the cylindrical seat.

8. The differential mechanism as claimed in claim 7, wherein the first stopper and the second stopper are made copper or steel.

9. The differential mechanism as claimed in claim 1, wherein the seat is made of cast steel.

10. The differential mechanism as claimed in claim 1, wherein the cover includes an annular groove concentric to the first drive axle and to the input coupling.

* * * * *